Sept. 12, 1972         P. W. ESTES         3,690,924
PRESSURE SENSITIVE ADHESIVE ARTICLES
HAVING A RELEASE COATING
Filed Oct. 5, 1970

United States Patent Office 3,690,924
Patented Sept. 12, 1972

3,690,924
PRESSURE SENSITIVE ADHESIVE ARTICLES
HAVING A RELEASE COATING
Phillip W. Estes, Groveton, N.H., assignor to
W. R. Grace & Co., Cambridge, Mass.
Filed Oct. 5, 1970, Ser. No. 77,795
Int. Cl. C09j 7/04
U.S. Cl. 117—68.5
3 Claims

ABSTRACT OF THE DISCLOSURE

A pressure-sensitive adhesive coated article, such as a tape, having a release coating with superior organic solvent and water resistance on side opposite the adhesive coating comprising a water soluble, organic solvent-insoluble film forming polymer, e.g. polyvinyl alcohol, as the major component, a fluorochemical containing a nonpolar "head" portion of the structure

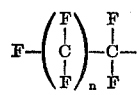

and a polar "tail" portion which is a carboxylic acido group of the Werner complex type with chromium and an insolubilizer for said polyvinyl alcohol.

---

This invention relates to pressure sensitive adhesive-release compositions. More particularly, this invention concerns compositions suitable for use as coatings to provide release from pressure sensitive adhesives which compositions possess good organic solvent and water resistance in addition to release properties.

To the adhesive coating of pressure sensitive adhesive coated materials is usually affixed a covering material to protect the adhesive coating. The covering material is rendered easily removable from the adhesive coating without taking the coating with it by providing a layer of a material having good "release" properties between the covering and the adhesive layer. Thus in the manufacture of printed labels, for example, having a layer of pressure-sensitive adhesive as the means for securing the label, a cellulosic sheet having a material which possesses good release properties from the adhesive coated on one side thereof has been employed to protect the adhesive layer prior to use. Similarly in the manufacture of pressure sensitive adhesive tapes, the side of the tape backing opposite that to which the pressure sensitive adhesive is applied has coated thereon a release material to permit ready separation of the adhesive and the backing when the tape is unwound.

A major use for pressure sensitive adhesive tape is in the "masking" of automobiles and the like prior to painting. The tape prevents paint from being applied to masked areas during the painting operation. The organic solvents contained in the paint lacquers widely used by the painting industry quite often penetrate the backing of the tape to the pressure sensitive adhesive causing failure of the adhesive bond. Penetration of the solvent is, at times, sufficiently severe to cause the tape and any masking paper held thereby to fall off the painted article. Additionally, masking tape applied to articles exposed to water, such as painted automobiles exposed to the rain outside of paint shops, suffers loss of adhesion due to penetration of the water.

A composition suitable for use as a release coating in connection with pressure sensitive adhesive-coated articles such as adhesive tapes has been found, which coating possesses excellent resistance to the penetration of organic solvents and water in addition to good release properties from the pressure sensitive adhesive.

Figure 1:
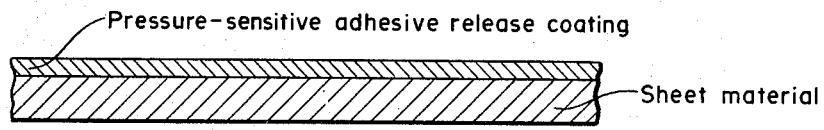
FIG. 1 is a cross section of a flexible sheet material having a coating of the release composition of the invention thereon.
Figure 2:
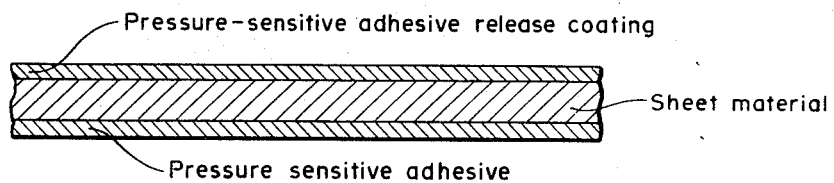
FIG. 2 is a cross section of a flexible sheet material, such as a standard pressure sensitive adhesive tape backing, having a layer of pressure sensitive adhesive on one surface and a coating of the release composition of the invention on the opposite surface.

The novel release coating composition comprises a major amount of a water-soluble, organic solvent insoluble-film forming polymer and from about 1.5 to about 15 preferably no more than about 12 percent by weight, based on the amount of the aforementioned polymer, of a water soluble, long chain fluorochemical component having a terminal carboxylic acido group of the Werner complex type with chromium. Optionally, a material which increases the insolubility of the film forming polymer can be employed in the composition in an amount which ranges generally between about 1 and 30 percent by weight based on the dry weight of the film forming polymer.

The water soluble, organic solvent insoluble-film forming polymer employed in the invention should be compatible with the fluorocarbon component. Exemplary of such film-forming polymeric materials are polyvinyl alcohol, oxidized and enzyme-converted starch, hydroxyethyl cellulose etc.

The water-soluble, long chain fluorochemical component employed in the invention contains a nonpolar fluorocarbon "head" portion,

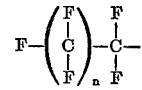

wherein $n$ is about 4 to 15, and, as aforementioned, a polar terminal carboxylic acido group of the Werner complex type with a trivalent nuclear chromium atom. The polar, active hydrogen-reactive Werner complex portion can combine with, for example, a cellulosic adhesive tape backing material and/or active hydrogen atoms of the film forming polymer component of the invention. Preferred as such fluorocarbon-Werner complexes for use in the present invention are those containing a sulfonamido group often having the structural formula:

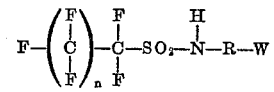

wherein $n$ is from about 4 to 15; R is a divalent alkyl group of from about 1 to 5 carbon atoms and W is a carboxylic acido group of the Werner complex type with chromium. The exact structure of the Werner complex-type terminal group is not known with certainty but is believed to be best represented as:

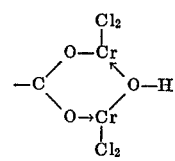

Formation of such Werner type coordinated groups by reaction of a terminal carboxylic acid group with, for example, chromyl chloride and heating, is described in U.S. Pat. 2,273,040, the disclosure of which is hereby incorporated by reference to the extent applicable.

Materials which can be used to further insolubilize the film forming polymer component will be evident to those skilled in the art. For example, when polyvinyl alcohol is employed as the film forming polymer, any of the well-known insolubilizers for this material can be used such as aldehyde compounds, for example, furfural; water-soluble formaldehyde derivatives such as dimethylolurea and melamine formaldehyde; phenol; resorcinol; metal salts, for example, chromic nitrate and sodium, potassium, ammonium and cupric dichromate; cuprammonium hydroxide and titanium lactate. When an aldehyde such as those aforementioned are employed to insolubilize polyvinyl alcohol, an acid catalyst such as ammonium chloride, ammonium sulfate, ammonium nitrate, or hydrochloric or sulfuric acid is generally employed to promote crosslinking between the aldehyde and the polyvinyl alcohol film. The amount of the catalyst employed usually ranges between about 1 and 50 weight percent, based on the weight of the aldehyde insolubilizer.

The release coating of the invention can be deposited upon any of the flexible materials ordinarily employed in the art as protective coverings for pressure sensitive adhesives or as backings for pressure sensitive adhesive tape. Examples of such materials include fibrous and non-fibrous materials which may be made by weaving, compounding, extruding, etc., such as, for example, paper, cotton and other cellulosic materials, usually impregnated with a resin; plastics such as acetates, vinyl halides, polyalkylene and polyester films; glass fabrics; metal foils, etc.

The coating composition of the invention may be employed to provide release from adhesives conventionally used as pressure sensitive adhesives. Such adhesives generally comprise a film-forming elastomeric ingredient and a tackifying agent. Illustrative of such elastomeric material are natural and synthetic rubbers such as polyisobutylene, polybutadiene, polychloroisoprene, polyisoprene and ethylene-propylene polymers, polyvinyl $C_1$ to $C_4$ ethers, copolymers of butadiene and acrylonitrile, butadiene and styrene, polyacrylates, and other synthetic and natural rubbers or elastomers. The tackifying agents are added in order to provide adherence to surfaces without application of appreciable pressure. Exemplary of such tackifying agents are polyterpene resins, hydrocarbon resins, polymerized or disproportionated rosin esters, wood rosin, oil soluble phenolic resins, and the like. Other common components of pressure-sensitive adhesive formulations include fillers, examples of which are clays, diatomaceous earth, silica, talc, zinc oxide, calcium carbonate, etc.; antioxidants, as for example, polyhydric phenols and their alkyl derivatives, diaryl amines, metal chelating agents, etc.; and plasticizers such as mineral oil, lanolin, liquid polybutenes, or polyacrylates.

Optionally, primers which improve the bonding characteristics of certain protective covering or tape backing material surfaces for better adhesion of the pressure-sensitive adhesive thereto, are employed in the art. Such primers include natural and synthetic elastomers which can be applied in solution or in latex form.

The coating composition of the invention is applied to the protective covering or tape backing in the form of an aqueous solution. Generally, a coating weight in the range of about 1 pound to 10 pounds per 3000 square feet of covering or backing is employed.

The following example is intended as a further illustration of the present invention and should not be considered as limiting in any manner.

EXAMPLE

To 5 parts by weight (dry) of polyvinyl alcohol (5% aqueous solution) is added 2 parts by weight of a 30% solution in isopropyl alcohol of a fluorochemical having the above-described structural formula wherein $n$ is 7 to 8, and R is

("FC–805," a commercial product of the Minnesota Mining and Manufacturing Co.). The fluorochemical is further characterized by the following physical properties:

| | |
|---|---|
| Appearance | Dark green liquid. |
| Odor | Alcoholic (isopropyl alcohol). |
| Medium | Isopropyl alcohol. |
| Flash point | 70° F. |
| Specific gravity | 1.0 (approximately). |
| Stability | Soluble in water in all proportions. Soluble in short-chain aliphatic alcohols. |
| Solution stability 130° F. (0.6% in 200 p.p.m. hardness) | Greater than 4 hours. |
| Typical Analysis: | |
| Solids (3 hrs. 110° C.) | 30%. |
| Isopropyl alcohol | 65%. |
| Chromium | 4.5%. |
| Water | 5%. |

0.5 part by weight of melamine formaldehyde resin and 0.05 part by weight of ammonium chloride were then added at 25% solutions.

The composition was tested for release properties employing the test procedure outlined in PSTC–1, "180° Peel Adhesion," published by the Pressure Sensitive Tape Council and issued September 1955, and as revised April 1966. In the test, a "control" run is first made by adhering a 1" by 5" strip of standard pressure sensitive adhesive tape to a stainless steel panel and the 180° peel value measured, in ounces, using a tensile testing apparatus. The results of the "control" run provide an evaluation of the adhesive strength of the pressure sensitive adhesive employed on the tape. The non-adhesive coated side of a strip of the adhesive tape is then coated with a layer of the release coating composition of Example I and applied to the stainless steel panel. A 1" by 5" strip of the adhesive tape is then applied to the release coated side of the adhered tape and the 180° peel value of the second strip from the release coated tape is then measured. A comparison of this value with the control provides an evaluation of release properties. The results of the test are reported below in Table I.

TABLE I

| | Initial adhesion | 3 day adhesion [1] | 3 day adhesion [2] |
|---|---|---|---|
| Control, ounces | 43 | 38 | 49 |
| Composition of example, ounces | 25 | 32 | 36 |

[1] After 3 days at 70° F. and 50% relative humidity.
[2] After 3 days at 145° F. and 85% relative humidity.

The data shown in Table I demonstrate the release qualities of the composition of the above example as evidenced by the decrease in the force required to peel the adhered strip of tape.

The composition of the above example was applied to one side of a standard rubber-impregnated cellulosic tape backing material in an amount of 7 pounds per 3000 square feet. A sample of the thus coated backing was tested to determine the resistance of the coating to organic solvents and water by adhering a strip of standard pressure sensitive adhesive tape to the uncoated side of the sample and then subjecting the adhesive tape to a pressure of 1000 p.s.i. to firmly adhere the tape to the sample backing. A 50 gram weight was suspended from one end of the adhered tape and a predetermined amount of solvent or water is applied to the release composition-coated side of the tape backing. The length of time between application of the solvent or water and peeling away of the tape is recorded.

The results are presented in Table II below. For comparison, other release coatings were likewise tested.

TABLE II

| Coating | Penetration time (seconds) | |
| --- | --- | --- |
| | Methyl isobutyl ketone | Water |
| Coating composition of example | 10,000+ | 10,000+ |
| Commercial release Coating I | 1,000 | |
| Commercial release Coating II | 550 | |
| Oil modified phenolic varnish | 220 | 10,000 |
| Gelatin and formaldehyde | 4,500 | 1,000 |

The results shown in Table II demonstrate that only the coating prepared from the composition of the invention exhibited both superior solvent resistance and water resistance.

Table III below demonstrates the importance of the ratio of the fluorochemical component to the organic solvent-insoluble film forming component with respect to organic solvent and water resistance. The data shown in Table III are the results of several test runs for penetration time of methyl isobutyl ketone and water made in accordance with the test procedure outlined above. The release coating had the identical composition to that of the above example except that the ratio of polyvinyl alcohol to fluorochemical was varied as shown.

TABLE III

| Parts by weight of polyvinyl alcohol to fluorochemical | Penetration time (seconds) | |
| --- | --- | --- |
| | Methyl isobutyl ketone | Water |
| 1/0.3 | 1,100 | 10,000+ |
| 3/0.6 | 3,000 | 10,000+ |
| 5/0.6 | 10,000+ | 10,000+ |
| 3/0.3 | 10,000+ | 10,000+ |
| 10/0.3 | 10,000+ | 10,000+ |
| 25/0.3 | 10,000+ | 1,200 |

It is claimed:
1. A pressure sensitive adhesive coated article comprising a flexible substrate, a layer of pressure sensitive adhesive applied to one side of said substrate, and a release coating having superior organic solvent and water resistance disposed on the side of said substrate opposite to said adhesive coated side, said release coating being deposited from a composition comprising a major amount of polyvinyl alcohol, an insolubilizer for said polyvinyl alcohol in an amount between about 1 and 30 weight percent, based on the weight of said polyvinyl alcohol, and about 1.5 to 15 weight percent, based on the weight of said polymer, of a water soluble fluorochemical containing a nonpolar head portion having the structural formula:

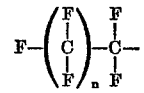

wherein $n$ is about 4 to 15, and a terminal polar portion of the Werner type wherein a trivalent nuclear chromium atom is coordinated with a carboxylic acido group.

2. The article of claim 1 wherein said fluorochemical has the structural formula:

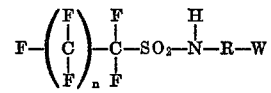

wherein $n$ is about 4 to 15, R is a divalent alkyl group of from about 1 to 5 carbon atoms and W is a Werner type complex group wherein a trivalent nuclear chromium atom is coordinated with a carboxylic acido group.

3. The article of claim 1 wherein said insolubilizer is an aldehyde and an acid catalyst is additionally present in an amount between 1 and 50 weight percent, based on the weight of said aldehyde, to promote crosslinking between said aldehyde and said polyvinyl alcohol.

References Cited

UNITED STATES PATENTS

| | | | |
| --- | --- | --- | --- |
| 3,236,677 | 2/1966 | Bradstreet | 117—68.5 |
| 2,648,614 | 8/1953 | Martin et al. | 117—122 |
| 3,027,271 | 3/1962 | Plasse et al. | 117—68.5 X |
| 2,693,458 | 11/1954 | Olson | 117—121 X |
| 2,975,018 | 3/1961 | Schubert et al. | 117—121 UX |
| 2,934,450 | 4/1960 | Brown | 117—121 UX |
| 3,088,958 | 5/1963 | Eleuterio | 117—121 |
| 3,068,125 | 12/1962 | Clayton et al. | 117—121 X |
| 3,054,696 | 9/1962 | Segal et al. | 117—121 X |
| 2,662,835 | 12/1953 | Reid | 117—121 |

WILLIAM D. MARTIN, Primary Examiner

B. D. PIANALTO, Assistant Examiner

U.S. Cl. X.R.

117—76 A, 122 P, 122 PF